United States Patent [19]

Gordon

[11] 4,377,613
[45] Mar. 22, 1983

[54] NON-IRIDESCENT GLASS STRUCTURES

[76] Inventor: Roy G. Gordon, 22 Highland St., Cambridge, Mass. 02138

[21] Appl. No.: 302,216

[22] Filed: Sep. 14, 1981

[51] Int. Cl.³ .................. B32B 7/02; B32B 15/00; B05B 5/00; B05D 5/06
[52] U.S. Cl. .................. 428/212; 428/333; 428/432; 428/469; 427/160; 427/162; 427/164; 427/166; 427/255.3; 52/171; 350/1.6; 350/166
[58] Field of Search ............... 428/34, 333, 336, 432, 428/469, 212; 427/160, 162, 164, 166; 52/171

[56] References Cited

U.S. PATENT DOCUMENTS

| | | | |
|---|---|---|---|
| 3,677,814 | 7/1972 | Gillery | 428/432 |
| 3,710,074 | 1/1973 | Stewart | 52/171 X |
| 4,069,630 | 1/1978 | Chess et al. | 428/432 |
| 4,146,657 | 3/1979 | Gordon | 428/432 |
| 4,187,336 | 2/1980 | Gordon | 428/34 |
| 4,206,252 | 6/1980 | Gordon | 427/162 X |
| 4,216,259 | 8/1980 | Groth | 428/432 |
| 4,308,316 | 12/1981 | Gordon | 428/34 |

Primary Examiner—P. Ives
Attorney, Agent, or Firm—Andrew F. Kehoe

[57] ABSTRACT

This disclosure describes transparent glass window structures of the type bearing a coating of infra-red reflective material which is advantageously less than about 0.85 microns in thickness and wherein the observance of iridescence resulting from such a reflective coating is markedly reduced by provision of a very thin coating system beneath said infra-red reflective coating. The thin coating system forms means to reflect and refract light to interfere with the observation of iridescence. A particular advantage of the invention is the ability of the thin coating system to be coated in a fraction of time presently required to coat anti-iridescent interlayers of the prior art.

11 Claims, 3 Drawing Figures

NON-IRIDESCENT GLASS STRUCTURES

BACKGROUND OF THE INVENTION

This invention relates to glass structures bearing a thin, functional, inorganic coating (e.g. a coating of tin oxide forming means to promote reflectivity of infra-red light) which structures have improved appearance as a consequence of reduced iridescence historically associated with said thin coatings, and, also, to methods for achieving the aforesaid structures.

Glass and other transparent materials can be coated with transparent semiconductor films such as tin oxide, indium oxide or cadmium stannate, in order to reflect infra-red radiation. Such materials are useful in providing windows with enhanced insulating value (lower heat transport) in ovens, architectural windows, etc. Coatings of these same materials also conduct electricity, and are employed as resistance heaters to heat windows in vehicles in order to remove fog or ice.

One objectionable feature of these coated windows is that they show interference colors (iridescence) in reflected light, and, to a lesser extent, in transmitted light. This iridescence has been a serious barrier to widespread use of these coated windows (See, for example, American Institute of Physics Conference Proceeding No. 25, New York, 1975, Page 288).

In some circumstances, i.e. when the glass is quite dark in tone (say, having a light transmittance of less than about 25%) this iridescence is muted and can be tolerated. However, in most architectural wall and window applications, the iridescent effect normally associated with coatings of less than about 0.75 microns is aesthetically unacceptable to many people (See, for example, U.S. Pat. No. 3,710,074 to Stewart).

Iridescent colors are quite a general phenomenon in transparent films in the thickness range of about 0.1 to 1 micron, especially at thicknesses below about 0.85 microns. Unfortunately, it is precisely this range of thickness which is of practical importance in most commercial applications. Semiconductor coatings thinner than about 0.1 micron do not show interference colors, but such thin coatings have a markedly inferior reflectance of infra-red light, and a markedly reduced capacity to conduct electricity.

Coatings thicker than about 1 micron also do not show visible iridescence, in daylight illumination, but such thick coatings are much more expensive to make, since larger amounts of coating materials are required, and the time necessary to deposit the coating is correspondingly longer. Furthermore, films thicker than 1 micron have a tendency to show haze, which arises from light scattering from surface irregularities, which are larger on such films. Also, such films show a greater tendency to crack, under thermal stress, because of differential thermal expansion.

As a result of these technical and economic constraints, almost all present commercial production of such coated glass articles comprise films in the thickness range of about 0.1 to 0.3 microns, which display pronounced iridescent colors. Almost no architectural use of this coated glass is made at present, despite the fact that it would be cost-effective in conserving energy to do so. For example, heat loss of infra-red radiation through the glass areas of a heated building can approximate about one-half of the heat loss through uncoated windows. The presence of iridescent colors on these coated glass products is a major reason for the failure to employ these coatings.

The first successful solution to these problems is disclosed in U.S. Pat. Nos. 4,187,336 and 4,206,252. These patents disclose methods and processes whereby thin, usually $\frac{1}{4}$-wavelength coatings of selected refractive index or gradient coatings of similar optical thickness were coated over the glass substrate and beneath the infra-red reflective tin oxide. However, it became desirable to reduce the total time necessary to produce such coatings. The present invention arose out of work directed to such reduction of coating time.

SUMMARY OF THE INVENTION

It is one object of the present invention to provide means to eliminate the visible iridescence from semiconducting thin film coatings on transparent substrates, particularly glass, while maintaining their desirable properties of visible transparency, infra-red reflectivity, and electrical conductivity.

Another object of the present invention is to achieve the above goals without increasing the cost of production significantly over the cost of using ordinary iridescent, infra-red reflective films.

Another object of the present invention is to achieve the above aims with a process which is continuous and fully compatible with modern manufacturing processes in the glass industry.

A further object of the present invention is to achieve all of the above goals with products which are highly durable and stable to light, chemicals and mechanical abrasion.

Another object is to achieve all of the above goals using materials which are sufficiently abundant and readily available to permit widespread use.

It is a further object of the invention to utilize thin films to suppress iridescent effects without resort to films of light-absorptive metallic materials such as gold, aluminum, copper, silver and the like.

A major object of the present invention is to produce the iridescent-free structures at a higher coating rate than was possible with color suppression layers previously disclosed in U.S. Pat. No. 4,187,336.

A related object is to produce these structures using less raw material, since thinner layers are used.

A further object is to allow a wider choice of raw materials to be used for forming the required coatings by avoiding those systems which require selection of reactants which are compatible in simultaneous deposition of mixed reaction products for providing adjustable or variable refractive index.

Another object of the invention is to provide a glass structure comprising a compound coating wherein an outer coating is formed of an infra-red reflecting surface of about 0.7 microns or less and wherein an inner coating forms means for (a) reducing haze on the coated glass and, simultaneously and independently (b) reducing the iridescence of the glass structure by means of coherent addition of reflected light.

A further object of the invention is to provide a glass structure having the non-iridescent characteristics referred to above which structure is characterized by a step-wise, or a graduated, change in coating composition between glass and air.

Other objects of the invention will be obvious to those skilled in the art on reading the instant invention.

The invention utilizes the formation of two very thin layers of transparent material between the glass and the semiconductor film. This interlayer is much thinner than those previously disclosed to have iridescence-suppressing utility. These layers form an intermediate, iridescence-suppressing interlayer. With suitable choice of thickness and refractive index values, it has been discovered, the iridescent colors can be made too faint for most human observers to detect, and certainly too faint to interfere with widespread commercial use even in architectural applications. Suitable materials for these intermediate layers are also disclosed herein, as well as processes for the formation of these layers.

In the embodiments of the invention disclosed herein, the intermediate layer closer to the glass surface has a higher refractive index, while the intermediate layer further from the glass surface has a lower refractive index. This order of refractive index is the reverse of the order used in the color suppression layers disclosed previously in U.S. Pat. No. 4,187,336. By reversing the order, I have made the surprising discovery that color suppression can be achieved using thinner layers than required by the previous designs.

In one preferred embodiment of this invention, I use two intermediate layers, each of optical thickness approximately one twelfth (1/12) of a visible wavelength of about 5000 Angstroms in vacuum. The first intermediate layer, the layer closer to the glass, has a high refractive index of about the same value as the functional semiconductor coating (say of tin oxide). Indeed, this layer closest to the glass can be tin oxide. The next intermediate layer between that first intermediate layer and the functional, semiconductor coating, has a low refractive index about equal to that of glass (n=1.5). The total optical thickness of the two intermediate layers is thus about one sixth (1/6) of a visible wavelength. "Optical Thickness" is the thickness of the material multiplied by its index of refraction.

The previously disclosed designs for color suppression required a minimum of one quarter (1/4) of a visible wavelength, and some required one half (1/2) or more. Thus the present design increases production speed by at least 50%, and decreases raw material usage by at least 33%.

In another embodiment of this invention, the refractive index of the intermediate layer closer to the glass is substantially higher than that of the functional semiconductor coating. The total optical thickness of the two intermediate layers is then even less than about one sixth (1/6) of a visible wavelength.

In still another embodiment, the refractive index of the intermediate layer closer to the functional coating is substantially lower than that of the glass. The total optical thickness of the two intermediate layers is also less than about one sixth (1/6) of a visible wavelength.

By "substantially higher" and "substantially lower" in the foregoing two paragraphs is meant a deviation from the refractive index of the semiconductor coating which makes it practical to vary the total real thickness of the coating in response to the different refractive indices. Thus, for example, "substantially the same" refractive index can be taken as plus or minus 0.1 refractive index units, while deviations from this norm may be described as substantially lower or substantially higher.

"About 1/6 wavelength" defined an irregular and varying zone (best exemplified by reference to FIG. 2) which is substantially less than 1/4 wavelength in thickness. In practice, the actual thickness of the interlayer coating will conveniently range from about 30 to 60 nanometers depending on the system used and the color index which is acceptable.

In a less preferred embodiment, the intermediate layers are both intermediate in refractive index between those of the glass and the functional coating. The total optical thickness in this case is still less than about one fourth (1/4) of a visible wavelength.

Approximate formulas for the optical thicknesses of the intermediate layers are given by the following:

The optical thickness of the intermediate layer close to the glass is approximately $d_1 = (1/720) \cos^{-1}[(r_1^2 + r_2^2 - r_3^2)/2r_1r_2]$, in units of a *visible wavelength* (0.5 microns), where the Fresnel reflection amplitudes are given by:

$r_1 = (n_1 - n_g)/(n_1 + n_g)$ $r_2 = (n_1 - n_2)/(n_1 + n_2)$ $r_3 = (n_c - n_2)/(n_c + n_2)$ in terms of the refractive indices:
 $n_g$ = refractive index of the glass,
 $n_1$ = refractive index of the intermediate layer close to the glass,
 $n_2$ = refractive index of the intermediate layer closer to the functional semiconductor coating, and
 $n_c$ = refractive index of the functional semiconductor coating. These formulas assume the inverse cosine function is in degrees.

The optical thickness of the intermediate layer closer to the functional semiconductor coating is given approximately by $d_2 = (1/720) \cos^{-1}[(r_2^2 + r_3^2 - r_1^2)/2r_2r_3]$.

The two layer thicknesses predicted by these simple formulas are only approximate, since they neglect such effects as optical dispersion, surface roughness, multiple reflections, and the non-linear nature of color vision. Numerical calculations can include these effects, and thus provide more realistic predictions of optimum coating thicknesses. The quantitative basis for these numerical evaluations is disclosed in the next section, and some numerical results are given in the following section.

A unifying aspect of these various embodiments is that they all utilize a thin semiconductor coating arranged congruently with a second coating which forms means to substantially diminish iridescence by providing two additional interfaces forming means, with the mass of the second coating, to reflect and refract light in such a way that it markedly interferes with the observation of any iridescent colors.

Methods and Assumptions

It is believed desirable, because of the subjective nature of color perception, to provide a discussion of the methods and assumptions which have been used to evaluate the invention disclosed herein. It should be realized that the application of much of the theory discussed below is retrospective in nature because the information necessarily is being provided in hindsight, i.e. by one having a knowledge of the invention disclosed herein.

In order to make a suitable quantitative evaluation of various possible constructions which suppress iridescent colors, the intensities of such colors were calculated using optical data and color perception data. In this discussion, film layers are assumed to be planar, with uniform thickness and uniform refractive index within each layer. The refractive index changes are taken to be abrupt at the planar interfaces between adjacent film layers. Real refractive indices are used, corresponding to negligible absorption losses within the layers. The reflection coefficients are evaluated for normally incident plane light waves.

Using the above assumptions, the amplitudes for reflection and transmission from each interface are calculated from Fresnel's formulae. Then these amplitudes are summed, taking into account the phase differences produced by propagation through the relevant layers. These results have been found to be equivalent to the Airy formulae (see, for example, *Optics of Thin Films*, by F. Knittl, Wiley and Sons, New York, 1976) for multiple reflection and interference in thin films, when those formulae are applied to the same cases I considered.

The calculated intensity of reflected light has been observed to vary with wavelength, and thus is enhanced in certain colors more than in others. To calculate the reflected color seen by an observer, it is desirable first to specify the spectral distribution of the incident light. For this purpose, one may use the International Commission on Illumination Standard Illuminant C, which approximates normal daylight illumination. The spectral distribution of the reflected light is the product of the calculated reflection coefficient and the spectrum of Illuminant C. The color hue and color saturation as seen in reflection by a human observer, are then calculated from this reflected spectrum, using the uniform color scales such as those know to the art. One useful scale is that disclosed by Hunter in Food Technology, Vol. 21, pages 100-105, 1967. This scale has been used in deriving the relationship now to be disclosed.

The results of calculations, for each combination of refractive indices and thicknesses of the layers, are a pair of numbers, i.e. "a" and "b". "a" represents red (if positive) or green (if negative) color hue, while "b" describes a yellow (if positive) or blue (if negative) hue. These color-hue results are useful in checking the calculations against the observable colors of samples including those of the invention. A single number, "c", represents the "color saturation": $c=(a^2+b^2)^{\frac{1}{2}}$. This color saturation index, "c," is directly related to the ability of the eye to detect the troublesome iridescent color hues. When the saturation index is below a certain value, one is not able to see any color in the reflected light. The numerical value of this threshold saturation for observability depends on the particular uniform color scale used, and on the viewing conditions and level of illumination (see, for example, R. S. Hunter, *The Measurement of Appearance*, Wiley and Sons, New York, 1975, for a recent review of numerical color scales).

In order to establish a basis for comparison of structures a first series of calculations was carried out to simulate a single semiconductor layer on glass. The refractive index of the semiconductor layer was taken as 2.0, which is a value approximating tin oxide or indium oxide films, either of which could be functional semiconductor films used in the present invention. The value 1.52 was used for the glass substrate; this is a value typical of commercial window glass. The calculated color saturation values are plotted in FIG. 1 as a function of the semiconductor film thickness. The color saturation is found to be high for reflections from films in the thickness range 0.1 to 0.5 microns. For films thicker than 0.5 microns, the color saturation decreases with increasing thickness. These results are in accord with qualitative observations of actual films. The pronounced oscillations are due to the varying sensitivity of the eye to different spectral wavelengths. Each of the peaks corresponds to a particular color, as marked on the curve (R=red, Y=yellow, G=green, B=blue).

Using these results, the minimum observable value of color saturation was established by the following experiment: Tin oxide films with continuously varying thickness, up to about 1.5 microns, were deposited on glass plates, by the oxidation of tetramethyltin vapor. The thickness profile was established by a temperature variation from about 450° C. to 500° C. across the glass surface. The thickness profile was then measured by observing the interference fringes under monochromatic light. When observed under diffuse daylight, the films showed interference colors at the correct positions shown in FIG. 1. The portions of the films with thicknesses greater than 0.85 micron showed no observable interference colors in diffuse daylight. The green peak calculated to lie at a thickness of 0.88 micron could not be seen. Therefore, the threshold of observability is above 8 of these color units. Likewise, the calculated blue peak at 0.03 micron could not be seen, so the threshold is above 11 color units, the calculated value for this peak. However, a faint red peak at 0.81 micron could be seen under good viewing conditions, e.g. using a black velvet background and no colored objects in the field of view being reflected, so the threshold is below the 13 color units calculated for this color. We conclude from these studies that the threshold for observation of reflected color is between 11 and 13 color units on this scale, and therefore we have adopted a value of 12 units to represent the threshold for observability of reflected color under daylight viewing conditions. In other words, a color saturation of more than 12 units appears as a visibly colored iridescence, while a color saturation of less than 12 units is seen as a neutral.

It is believed that there will be little objection to commercialization of products having color saturation values of 13 or below. However, it is much preferred that the value be 12 or below and, as will appear in more detail hereinafter, there appears to be no practical reason why the most advantageous products according to the invention, e.g. those characterized by wholly color-free surfaces, i.e. below about 8, cannot be made economically. Indeed, color saturation values below 5 can be obtained by practice of the invention.

A value of 12 or less is indicative of a reflection which does not distort the color of a reflected image in an observable way. This threshold value of 12 units is taken to be a quantitative standard with which one can evaluate the success or failure of various multilayer designs, in suppressing the iridescence colors.

Suitable Materials

A wide range of transparent materials can be selected to make products meeting the aforesaid criteria by forming anti-iridescent undercoat layers. Various metal oxides and nitrides, and their mixtures have the correct optical properties of transparency and refractive index. Table A lists some materials which have high refractive indices suitable for forming the intermediate layer closer to the glass. Table B lists some materials which have low refractive indices suitable for forming the intermediate layer closer to the functional semiconductor coating. Film refractive indices vary somewhat with deposition method and conditions employed.

TABLE A

Coating Materials with High Refractive Index

| Material | Formula | Refractive Index |
|---|---|---|
| tin oxide | $SnO_2$ | 2.0 |
| silicon nitride | $Si_3N_4$ | 2.0 |
| silicon monoxide | SiO | about 2 |
| zinc oxide | ZnO | 2.0 |
| indium oxide | $In_2O_3$ | 2.0 |
| niobium oxide | $Nb_2O_5$ | 2.1 |
| tantalum oxide | $Ta_2O_5$ | 2.1 |
| hafnium oxide | $HfO_2$ | 2.1 |
| zirconium oxide | $ZrO_2$ | 2.1 |
| cerium oxide | $CeO_2$ | 2.2 |
| zinc sulfide | ZnS | 2.3 |
| titanium oxide | $TiO_2$ | 2.5 |

TABLE B

Coating Materials with Low Refractive Index

| Material | Formula | Refractive Index |
|---|---|---|
| silicon dioxide | $SiO_2$ | 1.46 |
| silicone polymer | $[(CH_3)_2SiO]_n$ | 1.4 |
| magnesium fluoride | $MgF_2$ | 1.38 |
| cryolite | $Na_3AlF_6$ | 1.33 |

Numerical Calculations of Color Suppression

An example of the intensity of reflected colors, as a function of total intermediate layer thickness, and of functional tin oxide thickness, is shown in FIG. 2. Total intermediate layer thickness is listed below a point in FIG. 2, and the functional tin oxide thickness is listed to the left of that point. If the color saturation index is larger than 12, then white light, after reflection, takes on the color indicated by the letter code (R=red, Y=yellow, G=green, and B=blue). If the color saturation index is 12 or less, then the coated glass is colorless, in the sense that white light reflected from the surface still appears white; no letter code appears in FIG. 2 for these combinations of thicknesses, for which the iridescent color is successfully suppressed. The particular color chart in FIG. 2 is calculated assuming that the intermediate layer closer to the glass has a refractive index of 2.0, and the intermediate layer further from the glass has a refractive index of 1.45, and that the optical thickness of the two layers remain in the ration 0.89:1.0 as the total intermediate layer thickness is varied over the figure. (A haze-inhibiting layer of refractive index 1.45 is also assumed to be deposited first on the glass, with optical thickness of 0.14 relative to the total intermediate layer. However, this haze-inhibiting layer has only a small effect on the color suppression design, since its refractive index is so close to that of the base glass. The thickness of this haze-inhibiting layer is included in the total intermediate layer thickness in FIG. 2).

From this color chart in FIG. 2, one may conclude, for example, that a functional tin oxide coating 0.2 microns thick may be made colorless by the use of a total intermediate layer thickness anywhere between 0.034 and 0.055 microns. Similarly, for a functional tin oxide coating 0.3 micron thick, effective intermediate layers range from 0.050 to 0.064 micron in thickness. For a 0.4 micron tin oxide thickness, the broader range of 0.034 to 0.68 microns in intermediate layer thickness, produces color suppression. Any intermediate layer between 0.050 and 0.055 microns thick suppresses the color for all functional tin oxide thicknesses greater than 0.12 microns.

Process for Forming Films

All of these films can be formed by simultaneous vacuum evaporation of the appropriate materials of an appropriate mixture. For coating of large areas, such as window glass, chemical vapor deposition (CVD) at normal atmospheric pressure is more convenient and less expensive. However, the CVD method requires suitable volatile compounds for forming each material. The most convenient sources for CVD are gases at room temperature. Silicon and germanium can be deposited by CVD from gases such as silane, $SiH_4$, dimethylsilane $(CH_3)_2SiH_2$, and germane $(GeH_4)$. Liquids which are sufficiently volatile at room temperature are almost as convenient as gases; tetramethyltin is such a source for CVD of tin compounds, while $(C_2H_5)_2SiH_2$ and $SiCl_4$ are volatile liquid sources for silicon. Similarly, trimethyl aluminum and dimethyl zinc, and their higher alkyl homologs, furnish volatile sources for these metals. Less convenient, but still useful, sources for CVD are solids or liquids which are volatile at some temperature above room temperature but still below the temperature at which they react to deposit films. Examples of this latter category are the acetylacetonates of aluminum, gallium, indium and zinc (also called 2, 4 pentanedionates), aluminum alkoxides such as aluminum isopropoxide and aluminum ethylate, and zinc propionate. For magnesium, no convenient compounds are known which are volatile below deposition temperature, so CVD processes are not believed to be applicable to the preparation of magnesium fluoride films.

Typical conditions under which metal oxide films have been successfully formed by chemical vapor deposition are summarized in Table C. Typically, the organometallic vapor is present in about one percent (by volume) in air. The films thus formed show good adhesion to both the glass substrate, and to subsequently deposited layers of tin oxide or indium oxide. The refractive indices of the mixed films are measured conveniently by taking the visible reflection spectra as a function of wavelength. The positions and heights of the maxima and minima in the reflected intensity can then be related to the refractive index of the deposited film.

TABLE C

Some Volatile Oxidizable Organometallic Compounds Suitable for Depositing Metal Oxide Layers, and Mixed Metal Oxide Layers with Oxidizing Gases Such as $O_2$ or $N_2O$

| | Compound | Volatization Temperature (°C.) | Deposition Temperature (°C.) |
|---|---|---|---|
| 1 | $SiH_4$ | gas at 20 | 300–500 |
| 2 | $(CH_3)_2SiH_2$ | gas at 20 | 400–600 |
| 3 | $(C_2H_5)_2SiH_2$ | 20 | 400–600 |
| 4 | $(CH_3)_2SiHSiH(CH_3)_2$ | 20 | 400–600 |
| 5 | $GeH_4$ | gas at 20 | 300–450 |
| 6 | $(CH_3)_3Al$ | 20 | 400–650 |
| 7 | $Al(OC_2H_5)_3$ | 200–300 | 400–650 |
| 8 | $Al(OC_3H_7)_3$ | 200–220 | 400–600 |
| 9 | $Al(C_5H_7O_2)_3$ | 200–220 | 500–650 |
| 10 | $Ga(C_5H_7O_2)_3$ | 200–220 | 350–650 |
| 11 | $In(C_5H_7O_2)_3$ | 200–220 | 300–600 |
| 12 | $(CH_3)_2Zn$ | 20 | 100–600 |
| 13 | $Zn(C_3H_5O_2)_2$ | 200–250 | 450–650 |
| 14 | $(CH_3)_4Sn$ | 20 | 450–650 |
| 15 | $Ta(OC_4H_9)_5$ | 150–250 | 400–600 |
| 16 | $Ti(OC_3H_7)_4$ | 100–150 | 400–600 |
| 17 | $Zr(OC_4H_9)_4$ | 200–250 | 400–600 |
| 18 | $Hf(OC_4H_9)_4$ | 200–250 | 400–600 |

The techniques of coating of hot glass with this inorganic coating are disclosed in U.S. Pat. Nos. 4,187,336 and 4,265,974, the teachings of which are incorporated herein by reference, and elsewhere in the prior art. The coatings applied by the processes disclosed herein can be applied using the same procedures except for the necessity of controlling the coating times to achieve the relatively thin coatings used herein.

The Haze Problem

When these same depositions were tried on ordinary window glass ("soda-lime" or "soft" glass) many of the resulting coatings showed considerable haze or scattered light. When the layer first deposited on soft glass is amorphous and consists of $SiO_2$, $Si_3N_4$, or $GeO_2$ or mixtures thereof, the coating is free of haze, no matter what the subsequent layers are. $Al_2O_3$ also gives clear coatings, provided it is deposited in the amorphous form, advantageously below a temperature of about 550° C. If the initial layer contains large proportions of $Ga_2O_3$, $ZnO$, $In_2O_3$, or $SnO_2$, then haze formulation is likely.

The first anti-iridescence layer to be deposited on a window glass surface is advantageously amorphous, rather than crystalline, in structure. Subsequently, deposited layers can be of a polycrystalline form, without causing any haze.

Illustrative Examples of the Invention

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

With the very thin coatings of the invention, it is difficult to achieve precise planar cutoffs of the various interlayer components. Consequently, in many embodiments of the invention, the resulting coating is much like a step-wise or gradient coating with the higher-refractive-index concentration being nearer the glass. For the purpose of this invention therefore such gradient and stepwise interlayer systems, the reverse (with respect to refractive index gradient) of those taught in the prior art U.S. Pat. Nos. 4,187,336 and 4,206,252 to Gordon, may be considered mechanical and optical equivalents of the two-interlayer-component systems described herein.

The silica-silicone terminology in the following examples is used to describe some thin layers only because analysis by ESCA (electron-scattering for chemical analysis) techniques and Auger analytical techniques show the presence of carbon in the coating. This suggests that some of the silicon-carbon bonds believed to be present during the coating process remain in the coating. However, the presence of the carbon is not to be believed to be functionally important. A silica coating of the proper refractive index and thickness is the optical and mechanical equivalent of those coatings described herein as silica-silicone coatings.

It also should be noted that the fluorine-bearing gas used in the formation of the tin-oxide interlayer coating is not utilized for the purpose of imparting electrical conductivity to that coating because that function is not usually required for the principal architectural use for which the product is intended. Nevertheless, it has been found that the rate of deposition of the tin oxide is substantially greater when the Freon-type gas is used.

IN THE DRAWINGS

Figure 1:
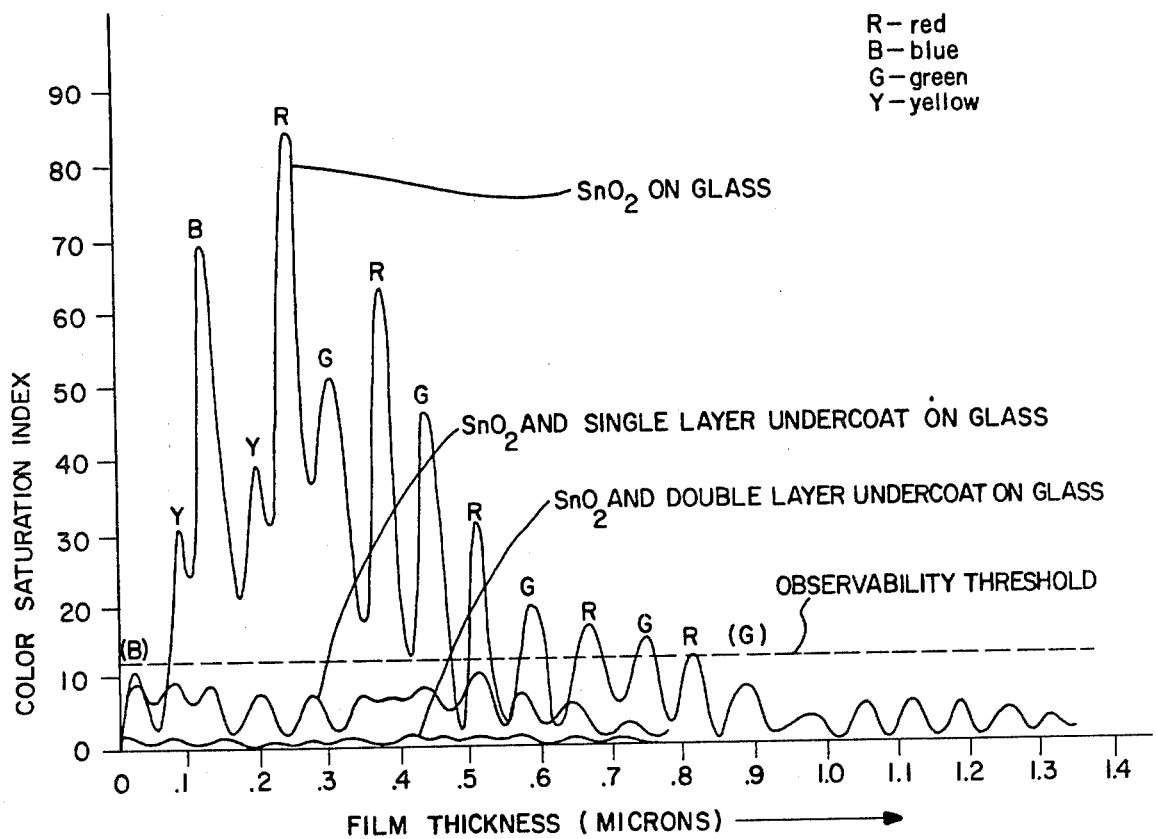
FIG. 1 is a graph illustrating the variation of calculated color intensity of various colors with semiconductor film thickness.
Figure 3:
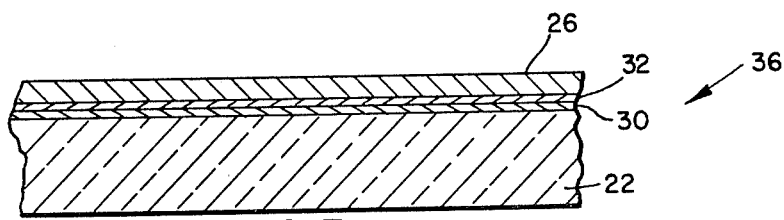

FIG. 3 illustrates a window 36 constructed of a semiconductor film 26, glass 22 and two intermediate coatings as follows: Coating 30 which is 0.018 microns thick and has a high refractive index of about 2.0. Coating 32 is about 0.028 microns and has a low refractive index of about 1.45. Coating 30 is formed of any of the materials disclosed in Table A. Coating 32 is formed of any of the materials disclosed in Table B.

EXAMPLE 1

By heating pyrex glass (refractive index about 1.47) to about 600° C., and passing reactant gas mixtures over it, the glass was coated with the following layers:

(a) A layer of tin oxide about 18 nanometers thick was deposited using a mixture containing 1.5% tetramethyltin, 3.0% bromotrifluoromethane and balance dry air, for about one second.

(b) Then about 28 nanometer of a silica-silicone mixture layer (refractive index about 1.45) was deposited using a gas mixture containing 0.4% tetramethyldisilane and balance dry air, for about five seconds.

(c) Finally a fluorine-doped tin oxide layer about 200 nanometers thick was deposited using the same gas mixture as in deposition (a), but with an exposure time of about 10 seconds.

The sample thus prepared has a substantially colorless appearance in reflected and in transmitted light.

EXAMPLE 2

The process of example 1 is carried out on a sample of soda-lime float glass, with the additional step of first coating the glass with a thin layer (about 10 nanometers thick) of a silica-silicone mixture, using a gas mixture containing 0.3% tetramethyldisilane in air, for about one second. Results similar to Example 1 are obtained. When this first protective layer is omitted, soda-lime glass samples coated according to Example 1 have a hazy appearance.

Figure 2:
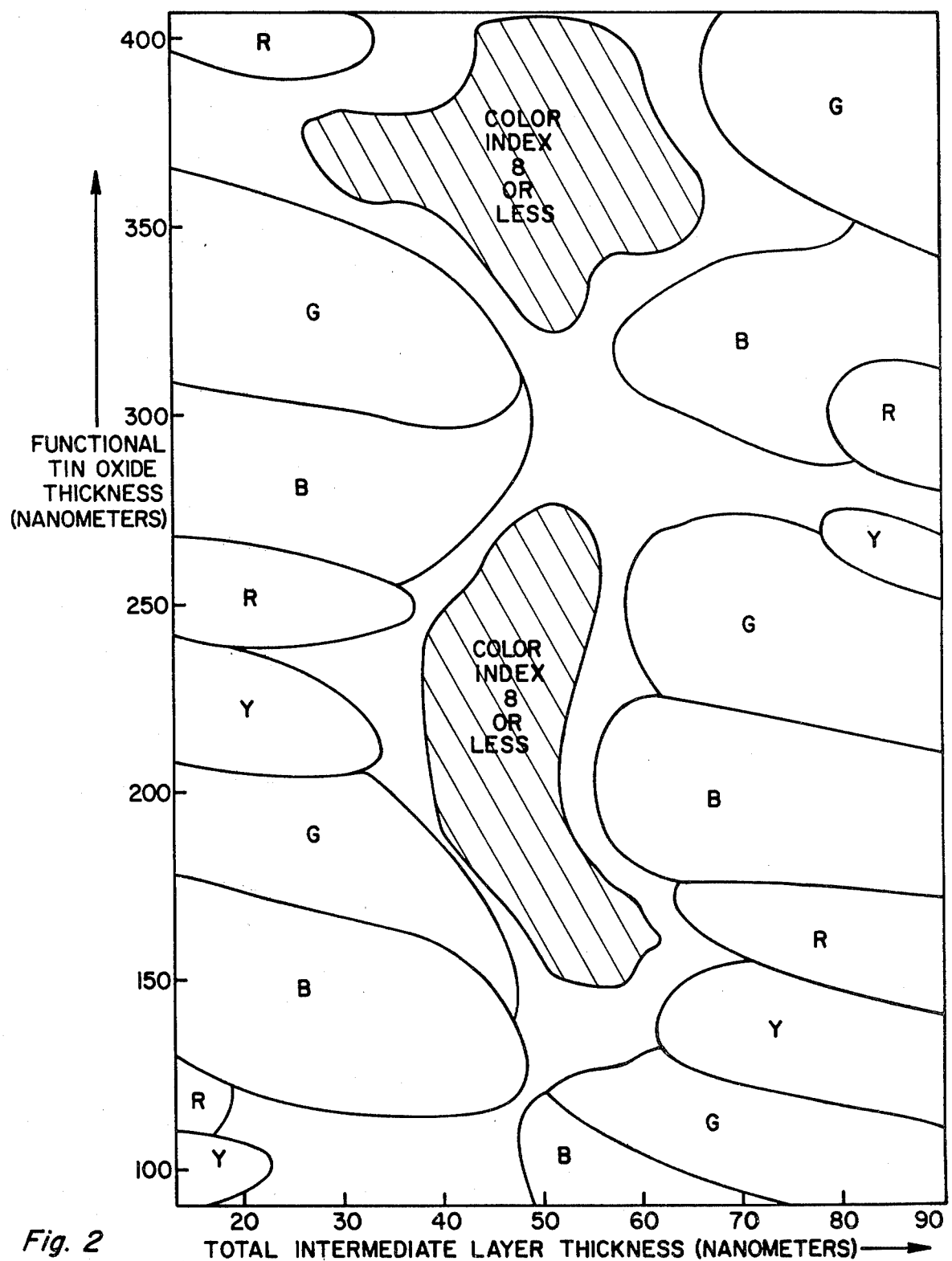
FIG. 2 illustrates graphically the iridescent character, or lack thereof, for various coating thickness of tin oxide (as an intermediate layer nearer the glass) in a system such as described in Example 2.

FIG. 2 further indicates how variations in tin oxide thickness will affect the optical performance of the interlayer. The type of profile as shown in FIG. 2 is typical of interlayer systems of the present invention.

EXAMPLES 3 AND 4

Titanium dioxide (refractive index about 2.5) is used in place of the intermediate tin oxide coating in Examples 1 and 2. Deposition (a) is replaced by the following:

(a) a layer of titanium dioxide about 8 nanometers thich is deposited from a gas mixture containing 0.2% titanium isopropoxide vapor in dry nitrogen carrier gas, for five seconds.

Results for Examples 3 and 4 equivalent to Examples 1 and 2, respectively, were obtained.

EXAMPLE 5

Silicon nitride (refractive index about 2.0) is used in place of the intermediate tin oxide coating in Example 1. Deposition (a) is replaced by the following:

(a) A layer of silicon nitride about 18 nanometers thick is deposited from a gas mixture containing 0.2% silane, 1.5% hydrazine, and balance nitrogen, for about twenty seconds.

This procedure is repeated using soda-lime glass; a haze-free appearance is obtained even without a silica-silicone protective layer.

It is also to be understood that the following claims are intended to cover all of the generic and specific features of the invention herein described and all statements of the scope of the invention which might be said to fall therebetween.

What is claimed is:

1. In a non-iridescent, transparent, sheet structure of the type comprising
   (A) a transparent substrate,
   (B) an infra-red reflective coating and
   (C) an iridescence-suppressing interlayer means between
   said substrate and infra-red-reflective coating, the improvement whereby said structure comprises, between said infra-red-reflective coating and said transparent substrate, an interlayer comprising
   (1) a first interlayer component of relatively high refractive index material, nearer to said substrate;
   (2) over said relatively high refractive index material, a second interlayer component of relatively low refractive index material, and
   (3) the combined interlayer components for said iridescence-suppressing means having a total optical thickness of about 1/6th of a 500 nanometer design wavelength.

2. A structure as defined in claim 1 wherein said infra-red-reflective coating and said first interlayer components are of about the same refractive index.

3. A structure as defined in claim 2 wherein said infra-red-reflective coating and said first interlayer component are both tin-oxide base coatings.

4. A structure as defined in claim 1 wherein said first interlayer component is of a refractive index substantially higher than the refractive index of the infra-red-reflective coating.

5. A structure as defined in claim 1 wherein said first interlayer component is of a refractive index substantially lower than the refractive index of the infra-red-reflective coating.

6. A structure as defined in claim 1 wherein said interlayer components are of refractive indices intermediate between the refractive index of the substrate and the infra-red-reflective coating.

7. A structure as defined in claim 1 wherein said optical thickness $d_1$ of said interlayer component closer to the substrate is about $$(1/720) \cos^{-1}[(r_1^2 + r_2^2 - r_3^2)/2r_1r_2]$$

wherein said optical thickness $d_1$ of said interlayer closer to the infra-red reflective layer is about $(1/720) \cos^{-1}[(r_2^2 + r_3^3 - r_1^2)/2r_2r_3]$ for a design wavelength of 500 nanometers and wherein $$r_1 = (n_1 - n_g)/(n_1 + n_g)$$

$$r_2 = (n_1 - n_2)/(n_1 + n_2)$$

$$r_3 = (n_c - n_2)/(n_c + n_2)$$

and wherein
 $n_g$ = refractive index of the substrate
 $n_1$ = refractive index of the interlayer closer to the substrate
 $n_2$ = refractive index of the interlayer closer to the functional semiconductor coating, and
 $n_c$ = refractive index of the infra-red reflective coating.

8. A structure as defined in any of claims 1, 2, 3, 4, 5, 6 or 7 wherein said refractive indices and optical thicknesses of said substrate, said interlayer components and said infra-red-reflective coating are selected to provide a color saturation value below about 12.

9. A structure as defined in any of claims 1, 2, 3, 4, 5, 6 or 7 wherein said refractive indices and optical thicknesses of said substrate, said interlayer components and said infra-red reflective coating are selected to provide a color saturation value below about 8.

10. A structure as defined in claims 1, 2, 3, 4, 5, 6 or 7 which is free from any metallic component or colored component which functions primarily to absorb visible light.

11. In a non-iridescent, transparent, sheet structure of the type comprising
    (A) a transparent substrate;
    (B) an electrically conductive coating and
    (C) an iridescence-suppressing interlayer means between said substrate and electrically conductive coating, the improvement whereby said structure comprises, between said conductive coating and said transparent substrate, an interlayer comprising
    (1) a first interlayer component of relatively high refractive index material, nearer to said substrate;
    (2) over said relatively high refractive index material, a second interlayer component of relatively low refractive index material, and
    (3) the combined interlayer components for said iridescence-suppressing means having a total optical thickness of about 1/6th of a 500 nanometer design wavelength.

* * * * *

UNITED STATES PATENT AND TRADEMARK OFFICE
CERTIFICATE OF CORRECTION

PATENT NO. : 4,377,613

DATED : March 22, 1983

INVENTOR(S) : Roy G. Gordon

It is certified that error appears in the above-identified patent and that said Letters Patent are hereby corrected as shown below:

Col. 7 line 64  Change "0.68" to --0.068--

Signed and Sealed this

Twenty-second Day of May 1984

[SEAL]

Attest:

GERALD J. MOSSINGHOFF

Attesting Officer

Commissioner of Patents and Trademarks